Dec. 20, 1932.  A. W. HARRISON  1,891,642
SIX-WHEEL SUSPENSION FOR VEHICLES
Filed May 14, 1930    3 Sheets-Sheet 1
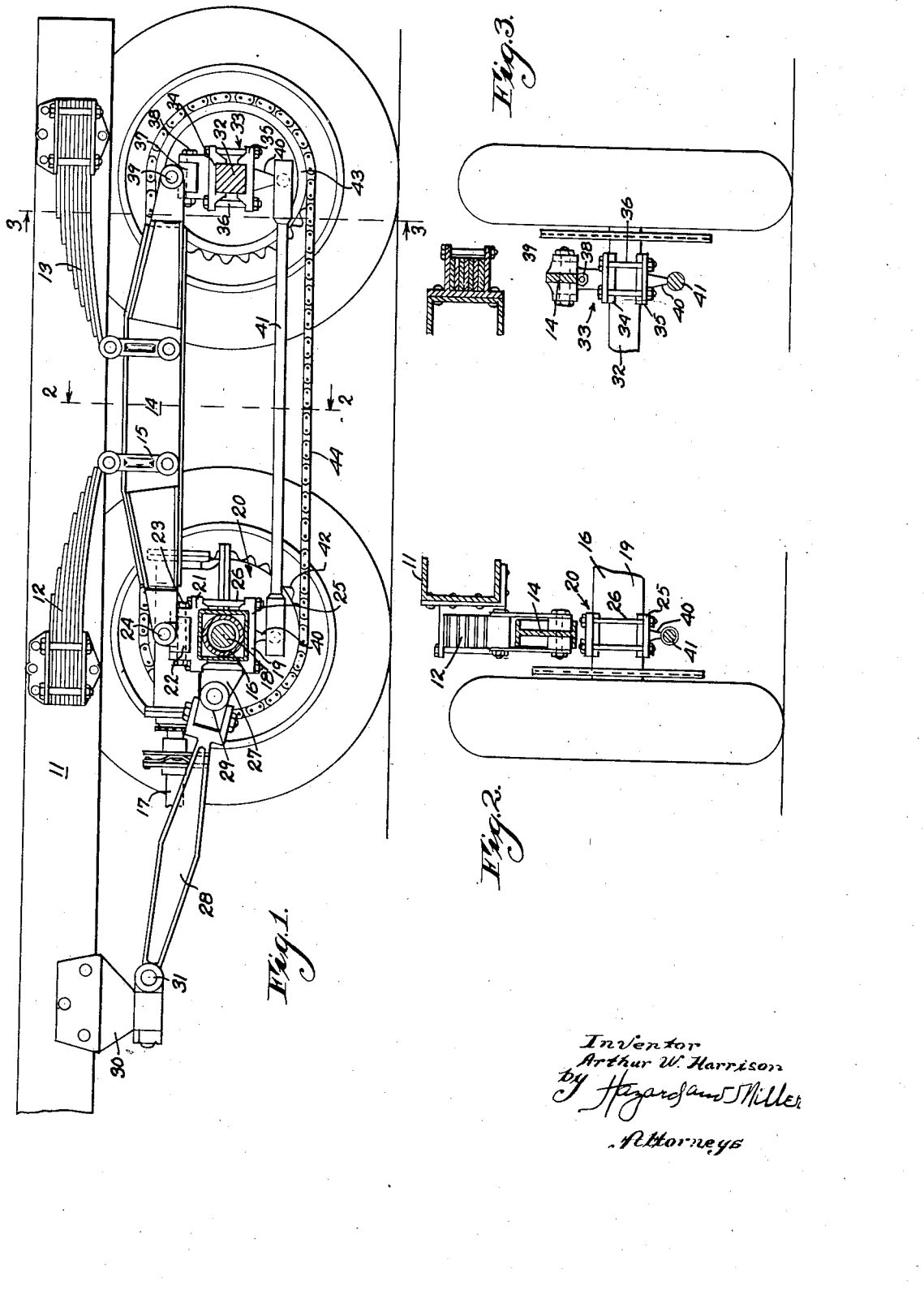

Dec. 20, 1932.   A. W. HARRISON   1,891,642
SIX-WHEEL SUSPENSION FOR VEHICLES
Filed May 14, 1930   3 Sheets-Sheet 2
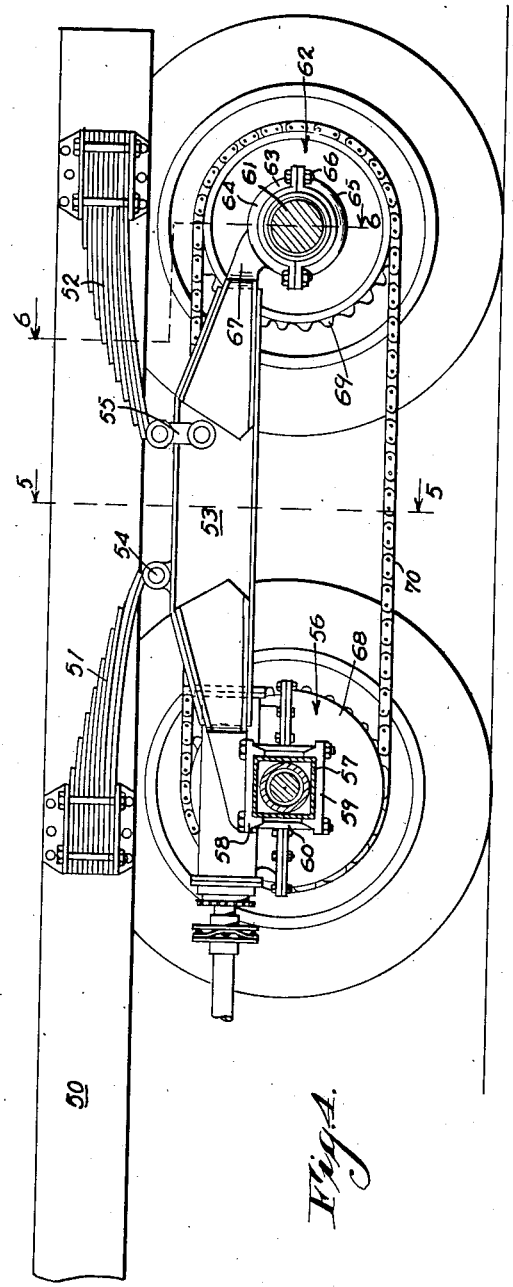
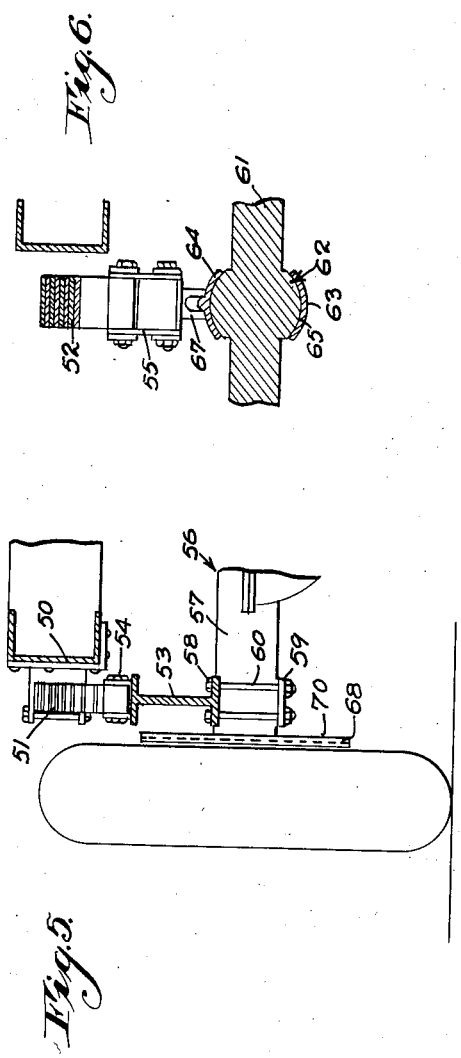
Inventor
Arthur W. Harrison.
by Hazard and
Miller
Attorneys

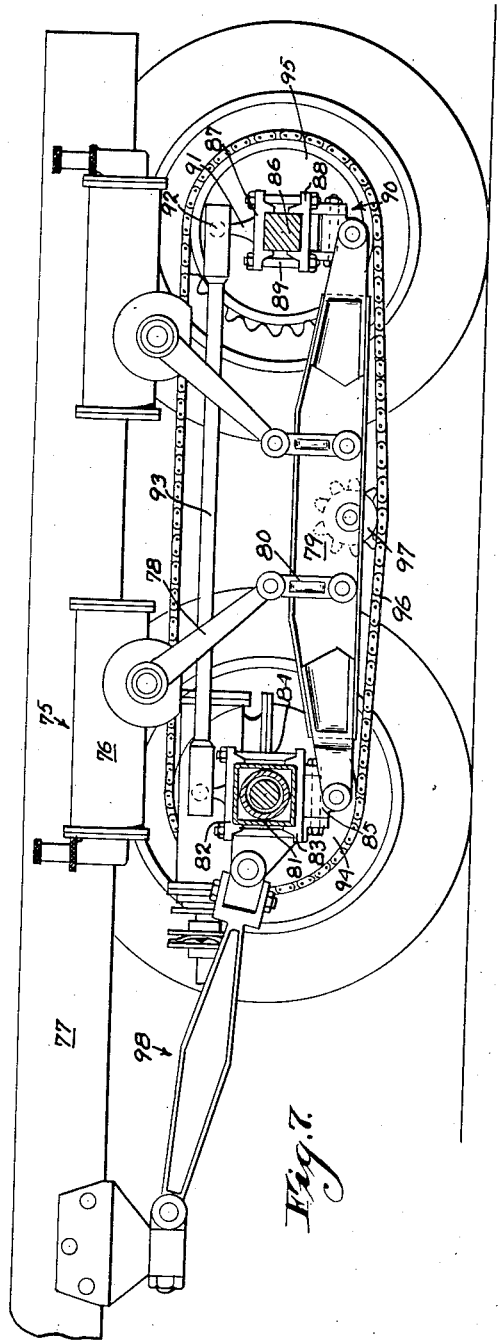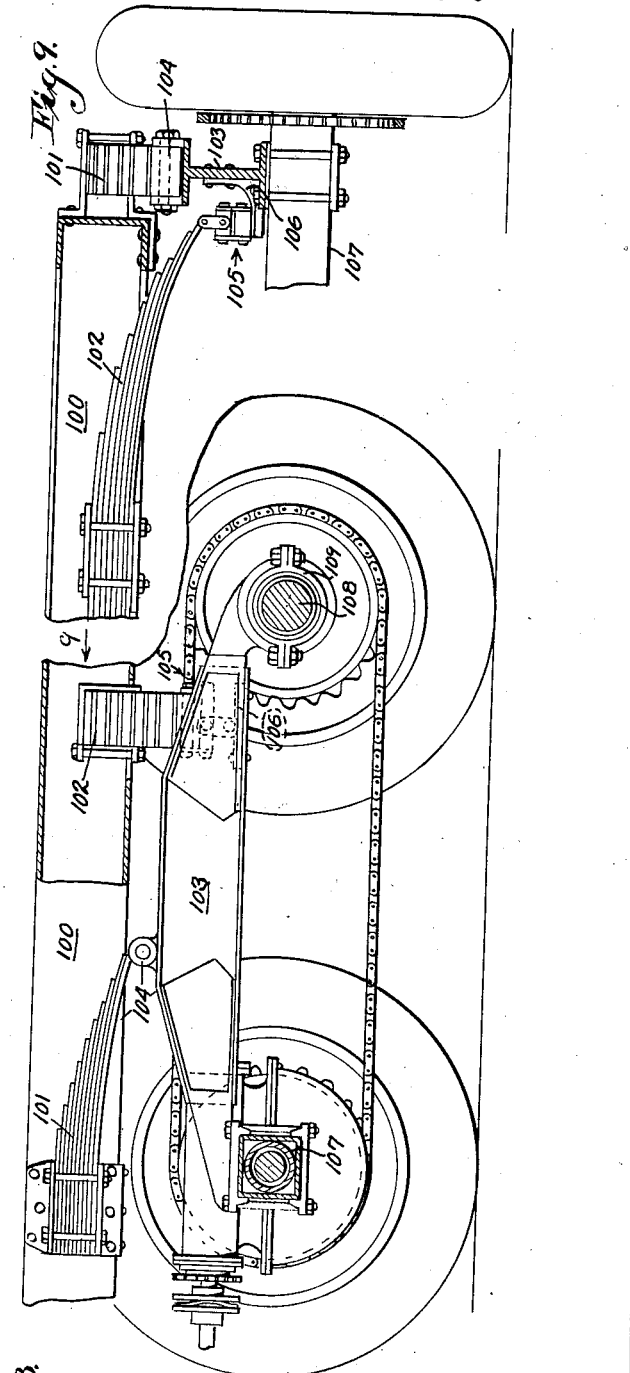

Patented Dec. 20, 1932

1,891,642

UNITED STATES PATENT OFFICE

ARTHUR W. HARRISON, OF LOS ANGELES, CALIFORNIA, ASSIGNOR OF ONE-HALF TO KAY-BRUNNER STEEL PRODUCTS, INC., OF LOS ANGELES, CALIFORNIA, A CORPORATION OF DELAWARE

SIX WHEEL SUSPENSION FOR VEHICLES

Application filed May 14, 1930. Serial No. 452,276.

My invention pertains to a six wheel suspension for vehicles and particularly to the mounting of four wheels to carry the rear end of the load and for driving.

An object of my invention in connection with the four wheel suspension and drive for the rear end of a motor vehicle, is in interlinking the two rear axles to have an interdependent spring action and to allow a free up and down movement of one axle in reference to the other axle.

A further object of my invention in this regard is in the use of a spring mounting connected to the frame of the vehicle and such mounting having the free operative ends of the spring or equivalent device connected to a heavy beam and having this beam connected to the main and the auxiliary axle. The main axle is designated as the front axle of the pair and the auxiliary axle as the trailing axle of the pair.

In this connection a further object of my invention is having a swivel connection between the main and auxiliary axles to retain such axles parallel and a constant distance apart, but to allow an up and down movement of one axle relative to the other axle.

Another object of my invention is in the drive for both sets of wheels. The main drive is preferably through the medium of a differential operating on the main axle through a propeller shaft and a chain and sprocket drive from the main wheels to the trailing auxiliary wheels; thus giving an effective four wheel drive to the vehicle.

My invention is illustrated in connection with the accompanying drawings, in which, Fig. 1 is a side elevation partly broken away, showing one form of suspension and drive for the four rear wheels of the vehicle;

Fig. 2 is a section on the line 2—2 of Fig. 1 in the direction of the arrows, of one half of the vehicle, showing the main driving axle and wheels;

Fig. 3 is a section on the line 3—3 of Fig. 1, in the direction of the arrows, of one half of the vehicle showing the rear axle and wheel and auxiliary or trailing wheels;

Fig. 4 is a modification of the construction of Fig. 1;

Fig. 5 is a half section on the line 5—5, showing the main axle and the main driving wheels on one side;

Fig. 6 is a half section on the line 6—6 of Fig. 4, showing one of the wheels and part of the axle of the trailing set of axle and wheels;

Fig. 7 is a side elevation partly broken away of another modification;

Fig. 8 is a side elevation of another modification with the rear wheels removed, showing a transverse spring mounting;

Fig. 9 is an end elevation taken in the direction of the arrow 9 of Fig. 8.

Referring to the drawings first of Figs. 1 and 2, 11 designates the side frame members of a vehicle having the leading and the trailing set 12 and 13 of quarter elliptic springs connected thereto. A beam 14 is connected to the shackles 15 of these springs. The beam is preferably an I-beam or any other suitable construction and is thickest at the center and tapered towards the opposite ends. The main drive mounting for the main or leading wheels, utilizes an axle housing 16 having a differential in which the worm wheel or pinion is driven by a propeller shaft 17 which extends from the forward part of the vehicle. The axle housing accommodates the axle 18 which is connected to drive the wheels in the ordinary manner. On each side of the axle housing which is illustrated as having a squared section 19, there is bolted a heavy clamping bracket 20. This is illustrated as having a top plate 21 with a swivel piece 22 mounted on a swivel bolt 23 to swivel transversely to the vehicle; the bolt running in a fore and aft direction.

This swivel piece connects to a swivel bolt 24 on the front of the beam 14, the bolt passing in a transverse direction to the vehicle, parallel to the axle. The bottom plate 25 of the clamp engages the underside of the squared part of the axle housing, these parts being secured together by bolts 26. Two brackets 27 are secured to the front portion of the axle housing and each bracket is connected to a radius rod 28 by a swivel piece 29 having swivels at right angles. The forward end of the radius rod is connected to a bracket 30 secured to each side frame of the vehicle. The forward end of the radius rod has a swivel connection 31 to swing in a vertical plane.

The rear or trailing axle and wheels utilizes an axle indicated at 32, one portion of which is indicated as square at each side and has a clamp designated generally by the numeral 33 secured thereto. This clamp has upper and lower plates 34 and 35 secured by bolt 36. The upper plate carries a swivel piece 37, swiveling on a fore and aft bolt 38 and a transverse bolt 39 connected to the rear end of the beam 14. Extending downwardly from both of the clamping plates 25 and 35, there is a stem 40 with a ball on the end having a coupling link 41 with a socket to accommodate the balls. The forward or main wheels are provided with a substantial sprocket 42 and the rear wheels with a sprocket wheel 43 and a sprocket chain 44 leads under these sprocket wheels and gives a drive from the main or leading wheels to the auxiliary or trailing wheels.

In Figs. 4, 5 and 6 I illustrate a modification of my invention, in which the beams are rigidly connected to the front axle housing and connected to the rear axle by a ball and socket connection. In this construction the vehicle side frame beams are designated by the numeral 50 having the forward and rearward springs 51 and 52 connected thereto. The beam 53, there being one on each side of the vehicle, is connected to the forward spring 51 by a pin connection 54 and to the rear spring 52 by a shackle 55; these being free to swing in a longitudinal direction. The forward end of the beam is secured to the rear axle housing 56, this housing having the rear driving axle and the differential and is provided with a squared section 57 adjacent the end. There are base plates 58 and 59 on the top and bottom of the axle housing secured together by bolts 60, thereby rigidly securing the forward end of each beam to the axle housing. In this construction there are no radius rods connected from the rear axle housing to the vehicle frame. The rear axle 61 is illustrated as having a ball section 62 and the rear end of the beam 53 is secured by an interior spherical shaped socket 63, this having an upper section 64 and a lower section 65 secured together by bolts 66. A web 67 connects the socket to the beam proper. This beam is of the I-beam type and tapered at each end.

Each of the wheels is provided with a sprocket wheel 68 and 69 having a connecting chain drive 70. By this construction the springs have a fixed and a longitudinally swinging connection with the beam and the beam is connected rigidly to the front axle housing and with a ball and socket connection to the rear axle housing, allowing therefore a slight independent movement of the rear axle housing in reference to the front axle housing and to the beams. This however, can never be sufficient to move the chains out of alignment with the sprockets to such an extent as to impair the drive from the front to the rear wheels. Therefore such wheels are effectively driven from the front wheels, and due to the differential in the front axle the rear set of wheels also have the differential rate of rotation in turning corners and other curves somewhat similar to the construction of Figs. 1, 2 and 3.

In the construction of Fig. 7 I make use of a combined hydraulic and spring type of suspension indicated generally by the numeral 75. This may be constructed in the same general lines as set forth in British Patent 199,172 to Oliver D. North for improvements in the springing of motor vehicles. This construction has cylinders 76 secured to the side frames 77 and from each cylinder there is an arm 78. There are two arms in each side and each is connected to a beam 79 by a shackle connection 80; thus allowing the arms and the beams to have a relative longitudinal swinging movement. This gives an underhung attachment to the front and rear axles. The front axle housing which encloses the differential and the front driving axle for the front set of wheels is illustrated as having a squared section 81 with top and bottom clamping plates 82 and 83 connected by bolts 84. The front end of the beam 79 is connected to the lower clamping plate by a double swivel connection 85. This has a longitudinal swivel connected to the clamping plate and a transverse swivel connected to the forward end of the beam 79.

The rear axle for the rear set of wheels is illustrated as having a squared section 86 with the upper and lower clamping plates 87 and 88 connected by bolts 89. The lower plate has a double swivel connection 90 with the rear end of the beam 79; this being of the same general construction as the swivel connection 85 having a longitudinal swiveling connection to a lower plate and a transverse swiveling connection to the beam.

Extending upwardly from the top plate 82 and the top plate 87 there are studs 91 with balls 92 at the top, there being a spacing link 93 connecting the balls on these studs. This therefore forms a parallel connection to the beam 79 between the front and rear axles. In this construction there is a front sprocket wheel 94 and a rear sprocket wheel 95 connected by a driving chain 96, there being an idler 97 giving a tension on the chain. In this construction I utilize radius rods 98 mounted on both sides of the vehicle and connecting the rear axle housing of the forward set of wheels with the frame 77. By this construction it will be seen that the drive is communicated from the front to the rear set of wheels, this having a differential action due to the differential drive to the front set and due to the spring action the wheels of each set can work up and down relatively to each other and yet maintain substantially a constant distance between the wheels due to the parallel connection between the beams and the spacing link 93.

In Figs. 8 and 9 I show a further modified construction in which the frame of the vehicle 100 has a longitudinal spring 101 at one side and a transverse spring 102 suitably mounted in the frame. There is a beam 103 on each side, the beam being connected to the spring 101 by the shackles 104 having a swinging action in a front and rear direction and a shackle link 105 connects the beam to the rear or transverse spring 102. This shackle link allows swiveling in a front to rear and in a transverse direction; there being preferably a bracket 106 attached to the beam 103 to carry this link.

In this case the forward end of the beam is illustrated as being secured to the squared end of the axle housing 107 which has the differential and drive for the front axle and the rear end of the beam 103 is connected to the rear axle 108 by a ball and socket connection 109 which may be similar to that illustrated in connection with Figs. 4 and 6. The drive from one wheel to the other is the same as in the prior figures, this being by chain carried over sprocket wheels on each of the road wheels.

Various changes may be made in the principles of my invention without departing from the spirit thereof as set forth in the description drawings and claims.

I claim:

1. A vehicle having a vehicle frame, a forward and a trailing set of wheels, the forward set having a differential axle housing with a driven axle therein, the trailing set having a stationary axle, a beam at each side of the vehicle connected at its forward end to the axle housing and at its rear end to the axle of the trailing wheels, a pair of springs on each side of the vehicle connected to a forward and a rearward part of the beam, radius rods connecting from the differential housing to the vehicle frame, means to drive the front axle and means to convey a drive from the leading to the trailing set of wheels.

2. A vehicle having a vehicle frame, a leading and a trailing set of wheels, each having an axle, a beam on each side of the vehicle, swivelly connected to each axle, a pair of springs on each side of the vehicle having a connection to forward and rearward portions of the beam, a connecting link on each side of the vehicle between the axles and substantially parallel to the beams, means to drive the axle of the leading wheels and means to convey a drive from the leading to the trailing wheels.

3. A vehicle having a vehicle frame, a leading and a trailing set of wheels, each having an axle, a beam on each side of the vehicle, means to connect the forward end of the beam to the axle of the leading wheels and the rear end of the beam to the axle of the trailing wheels, said connections having a swivel, a spacing link swivelly connected to each of the axles, a pair of spring suspension means connected to each beam adjacent a forward and a rearward portion and each connected to the vehicle frame, radius rods connected from the forward axle to the vehicle frame, means to drive the forward axle, and means to transfer a drive from the leading axle to the trailing wheels.

4. A vehicle having a vehicle frame, a leading and a trailing set of wheels, each having an axle, a beam on each side of the vehicle, a connection between each beam and the said axles, a leaf spring extending longitudinally of the vehicle on each side and each connected to a beam, a transverse spring connected to the vehicle and each having a swivel connection to the beam.

5. A vehicle as claimed in claim 4, the axle for the leading set of wheels being mounted within an axle housing and each beam being rigidly connected to said housing, the rear set of wheels having an axle, each beam having a ball and socket connection to said latter axle, means to drive the axle in the axle housing and a driving connection from the driven axle to the trailing set of wheels.

6. A vehicle having a vehicle frame, a leading and a trailing set of wheels, each having an axle, a beam on each side of the vehicle, swivelly connected to each axle, a pair of springs on each side of the vehicle and having a connection to a forward and a rearward position of the beam, and a connecting link on each side of the vehicle between the axles substantially parallel to the beams.

7. A vehicle having a vehicle frame, a leading and a trailing set of wheels, the leading set having a driven axle in an axle housing, the rear wheels having a stationary axle, a beam on each side of the vehicle, means to connect the forward end of the beam to the axle housing, and means to connect the rear end of the beam to the stationary axle, each of said connections having a swivel, a spacing link connected to the axle housing and to the axle, a forward and a rearward spring on each side of the vehicle frame, the free ends of said springs extending toward each other and being secured to a forward and a rear position of the beam, radius rods connected from the forward axle to the vehicle frame, means to drive the forward axle, and means to transfer the drive from the forward axle to the trailing wheels.

8. A vehicle having a vehicle frame, a leading and a trailing set of axles, the leading axle being mounted in an axle housing and being driven, the trailing axle being fixed, a beam on each side of the vehicle, a rigid connection between each beam and the axle housing and a movable connection to the trailing axle, a cantilever spring extending longitudinally of the vehicle on each side and connected to one of the beams at a forward position, a transverse spring connected to the vehicle and having its free ends extending toward each beam and connected thereto by a swivel.

9. A vehicle having a vehicle frame, a leading and a trailing set of wheels each having an axle, a beam on each side of the frame, each beam having a connection to each axle, a pair of spring suspension means on each side of the vehicle, each suspension means having a depending arm, the arms of each pair being connected to a beam on the same side of the vehicle.

10. A vehicle having a vehicle frame, a leading and a trailing set of wheels, each having an axle, means to drive the axle of the leading set of wheels, a beam having a swivel connection between said axles on each side of the frame, a link parallel to each beam and having a swivel connection with each axle, a pair of springs on each side of the vehicle, one of the springs of each pair having an end connected to the beam on the same side of the vehicle at a forward position of such beam, and the other spring of each pair having a connection to the same beam at a rearward position thereof, and a radius rod between the forward axle and the vehicle frame.

In testimony whereof I have signed my name to this specification.

ARTHUR W. HARRISON.